United States Patent [19]

Hardin, Jr. et al.

[11] 4,288,292

[45] Sep. 8, 1981

[54] CONNECTING APPARATUS FOR LIMITED ROTARY OF RECTILINEAR MOTION (II)

[75] Inventors: Roy T. Hardin, Jr., Greensburg; Carl D. Kurinko, Penn Township, Westmoreland County both of Pa.

[73] Assignee: The United States of America as represented by the United States Department of Energy, Washington, D.C.

[21] Appl. No.: 28,018

[22] Filed: Apr. 6, 1979

Related U.S. Application Data

[63] Continuation of Ser. No. 800,256, May 25, 1977, abandoned.

[51] Int. Cl.² ............... G21C 13/10; H02G 11/00
[52] U.S. Cl. ............................. 176/87; 248/68 R; 176/38
[58] Field of Search ............... 248/68 R; 176/38, 87

[56] References Cited

U.S. PATENT DOCUMENTS

| 3,123,328 | 3/1964 | Trickett et al. | 176/87 X |
|---|---|---|---|
| 3,432,128 | 3/1969 | Elleboudt | 248/68 R |
| 3,523,063 | 8/1970 | Zerna | 176/87 |
| 3,782,670 | 1/1974 | Kielma | 248/68 R X |
| 3,942,031 | 3/1976 | Bahder et al. | 176/87 X |
| 4,080,254 | 3/1978 | Poindexter | 176/38 X |

FOREIGN PATENT DOCUMENTS

| 2119464 | 4/1972 | France | 176/87 |
|---|---|---|---|
| 1432272 | 4/1976 | United Kingdom . | |

*Primary Examiner*—Peter A. Nelson
*Attorney, Agent, or Firm*—Edward L. Levine; Z. L. Dermer

[57] ABSTRACT

Apparatus for providing connection between two members having relative movement in a horizontal plane in a rotary or linear fashion. The apparatus includes a set of vertical surfaces affixed to each of the members, laterally aligned across a selected vertical gap. A number of cables or hoses, for electrical, hydraulic, or pneumatic connection are arranged between consecutive surfaces in a C-shaped traveling loop, connected through their end portions to the two respective members, so that through a sliding motion portions of the cable are transferred from between one set of surfaces to the other aligned set, across the gap, upon relative motion of the members. A number of flexible devices are affixed to the upper set of surfaces for supporting the upper portion of each looped cable. The apparatus is particularly adaptable to an area having limited lateral clearances and requiring signal level separation between electrical cables, such as found in the rotating plugs and associated equipment of the reactor vessel head of a nuclear reactor.

5 Claims, 11 Drawing Figures

CONNECTING APPARATUS FOR LIMITED ROTARY OF RECTILINEAR MOTION (II)

BACKGROUND OF THE INVENTION

The invention described herein was made in the course of, or under, a contract with the United States Energy Research and Development Administration (ERDA), the successor in interest to the United States Atomic Energy Commission (AEC).

This is a continuation of application Ser. No. 800,256, filed May 25, 1977, and now abandoned.

CROSS-REFERENCE TO RELATED APPLICATION

Reference is made to U.S. patent application filed concurrently herewith in the name of R. T. Hardin, entitled "Connecting Apparatus For Limited Rotary Or Rectilinear Motion", assigned to the Westinghouse Electric Corporation, and hereby incorporated by reference. That application discloses apparatus providing an alternative to that disclosed herein, particularly where lateral spatial limitations are not as severe.

1. Field of the Invention

This invention relates to apparatus for providing connection between two members having relative motion in a horizontal plane, especially members having limited lateral space therebetween, particularly adaptable to the rotating plugs of the reactor vessel head of a nuclear reactor.

2. Description of the Prior Art

Certain types of nuclear reactors require that refueling and maintenance operations be performed remotely, that is, without removal of the reactor vessel head. A plurality of rotating plugs have been provided for these operations which, through controlled rotation, allow remote access to core locations. It is important, however, that electrical and other connections be maintained to the various plugs and reactor components during relative motion. This requirement is complicated by the large number of connections and further by spatial limitations in the reactor head vicinity. This is particularly a concern with respect to the small rotating plug through which an in-vessel transfer machine must operate to shuffle fuel between the core and storage locations without removal of the reactor vessel head. Further, it is desirable that electrical signal level separation be provided among the various cables.

In the prior art, reactor designers faced with these limitations have utilized apparatus similar to a split tank-type track having a fixed end and a movable end. The cables are contained within supporting plates or carriers, having openings bored to the size of the cable diameters, which are positioned between a plurality of chain links. The links are assembled to a close tolerance, allowing bending of the apparatus as necessary during motion. Although such apparatus properly perform the cable connection function, they are not without deficiencies. The tracks require a significant amount of space, which can affect the design of the connected components or limit the number of cables utilized. Further, the track system requires a large number of individual interlocking components. The large number of pins and sliding joints adds a potential for failure and a significant cost to the reactor systems.

In other applications where it is desirable to provide electrical connections between movable components, systems have been proposed which have similar deficiencies, particularly in the complexity and relatively large number of components required. Two such applications are described in U.S. Pat. No. 3,351,612 in the name of R. L. Guntner, and U.S. Pat. No. 3,537,059 in the name of E. W. Howe.

It therefore is desirable to provide apparatus which allows continuous connection of the large number of cables or hoses during rotation and refueling operations which also minimizes interference with personnel and other equipment while additionally providing electrical signal separation.

SUMMARY OF THE INVENTION

This invention discloses apparatus for providing connection between two members movable with respect to each other in a horizontal plane in a limited rectilinear or rotary fashion. The apparatus is particularly adaptable to the small rotating plug of a nuclear reactor, and offers high reliability as a result of the relatively few moving components.

In a preferred embodiment the invention includes a number of upper vertically oriented plates or surfaces, laterally spaced from one another, each having a laterally extending upper restraint. It further includes a second set of lower vertical plates or surfaces, also laterally spaced from one another, and each having a laterally extending lower restraint. Each of these sets of vertical surfaces is affixed to one of the movable members, so that the vertical surfaces or plates are aligned at common lateral positions. The aligned sets are also vertically spaced from one another so as to provide a gap therebetween.

A number of flexible connecting conduits, or cables or hoses, are positioned so that a portion of each conduit is oriented between consecutive upper surfaces and a portion is positioned between consecutive lower surfaces, in a C-shaped traveling loop bounded above by the upper restraints and below by the lower restraints. The singular C-shaped loop of each cable passes across the gap between the aligned vertical surfaces upon relative motion of the two members. The cables are substantially stationary at opposite portions with respect to each of the respective members, either terminating at a junction or affixed to the surfaces. By forming the surfaces of suitable metallic or other material, structural integrity and electrical separation is provided by the surfaces.

A number of spring type devices are affixed to the upper surfaces so as to support the upper portion of each looped cable. The cables between any two consecutive aligned surfaces are preferably of substantially the same diameter and the spring device has an upper section and a crimped lower segment. The lower segment is spaced from one of the vertical surfaces a distance less than the diameter of the cables, while the upper section is spaced therefrom a distance greater than the common diameter. The upper portion of the cables can therefore be supported above the crimped section between the spring device and a mating vertical surface.

On relative motion of the members, a portion of the cables slide from between one pair of vertical surfaces to between the mating pair of surfaces, the C-shaped loop sliding with respect to both members. Where one member is fixed and the other moves, the moving vertical surfaces acquire additional cable as motion is in the direction which appears to pull cable from the stationary surfaces. Conversely, the stationary surfaces acquire cable as the moving surfaces rotate or move rectilinearly in the opposite direction. The spring device flexes laterally during these motions so that the cables pass freely into and out of contact with the springs.

The apparatus can advantageously include a number of cables between the same vertical surfaces, each cable being positioned within the vertical area enclosed by an adjacent outer cable. With cables of similar diameter, the lateral spacing between adjacent vertical surfaces is then slightly larger than this diameter, and the vertical gap between sets of surfaces is smaller than the diameter to alleviate the potential for cable binding upon motion.

BRIEF DESCRIPTION OF THE DRAWINGS

The advantages, nature and additional features of this invention will become more apparent from the following description, taken in conjunction with the accompanying drawings, in which.

DESCRIPTION OF THE PREFERRED EMBODIMENTS

Figure 1:
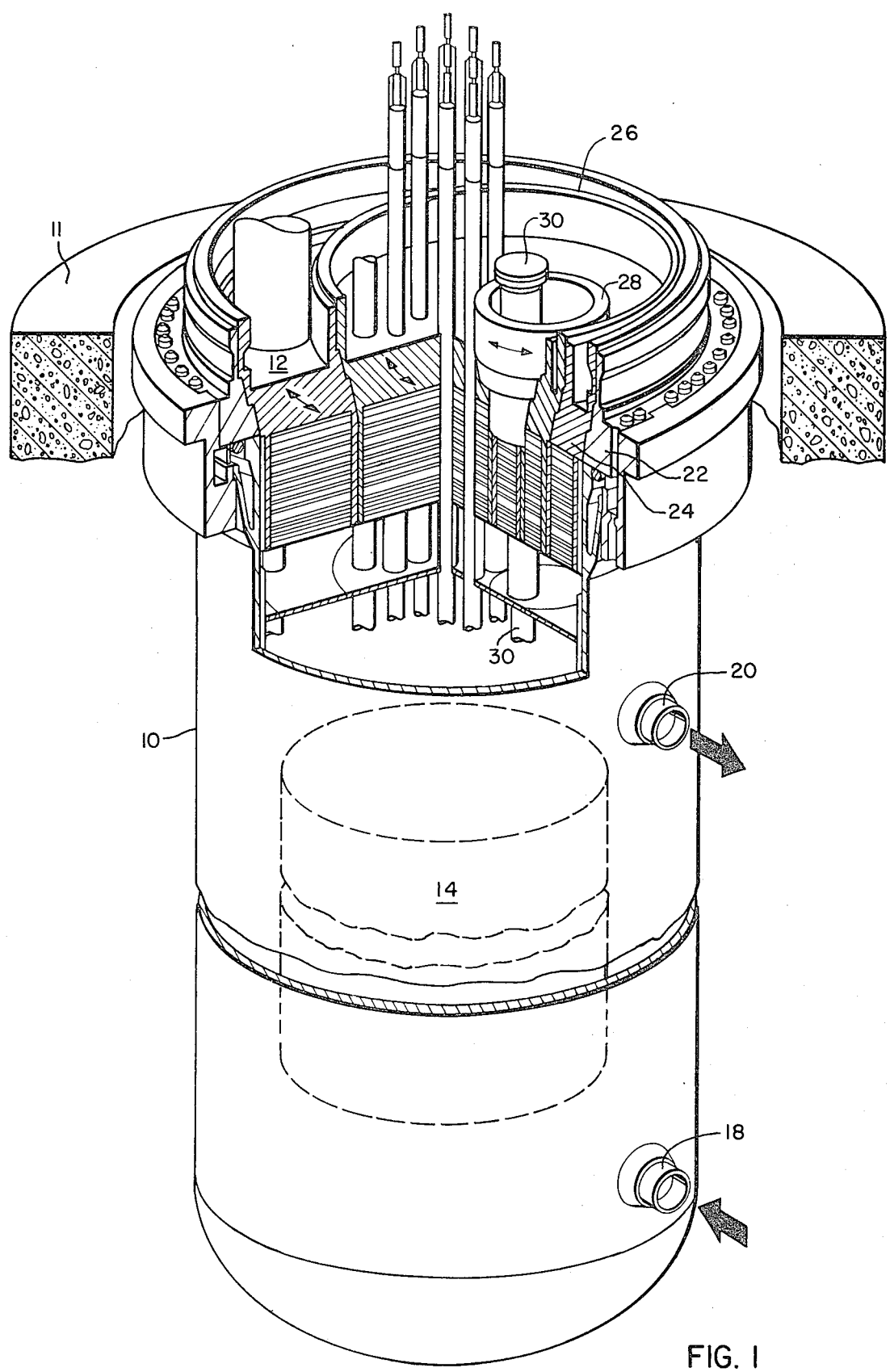
FIG. 1 is a perspective view, partially sectioned, of a nuclear reactor.

Referring now to FIG. 1 there is shown a nuclear reactor including a reactor vessel 10 sealingly affixed to a vessel head 12. The vessel is supported within a stationary enclosure, such as a concrete support 11. A nuclear core 14 comprised of a plurality of vertically oriented fuel assemblies is positioned within the vessel so that a coolant fluid, such as liquid sodium or gaseous helium, can be circulated through the core 14. The fluid enters the vessel 10 through a plurality of inlet nozzles 18, flows upwardly through the core, absorbing heat energy, and is discharged through outlet nozzles 20 to heat transfer and other apparatus, typically for the ultimate purpose of electrical power generation.

The vessel head 12 includes a stationary outer ring 22, a large rotating plug 24, an intermediate rotating plug 26, and a small rotating plug 28. The stationary outer ring is concentrically arranged about the large plug 24, while the intermediate 26 and small 28 plugs are arranged off-center. For refueling or maintenance, the plugs are rotated in a preselected sequence which positions an in-vessel transfer mechanism 30 directly above each core assembly location. The transfer mechanism 30 is typically positioned upon the small rotating plug 28 during refueling periods, and is subsequently removed from the vessel head area until the next refueling or maintenance outage. During reactor power generation, and also during refueling, hundreds of electrical and other connections must be maintained between equipment external to the vessel 10, and within the vessel and stop the rotating plugs. The connections are made through a plurality of conduits such as cables 32 which transfer power, fluids, and electrical signals for reactor control and instrumentation. Typical of the services supplied merely through the transfer machine are those for heaters, motor drives, jacks and blowers, limit switch connectors, compressed gases, thermocouples and ground wires. Hydraulic services can also be supplied.

Figure 2:
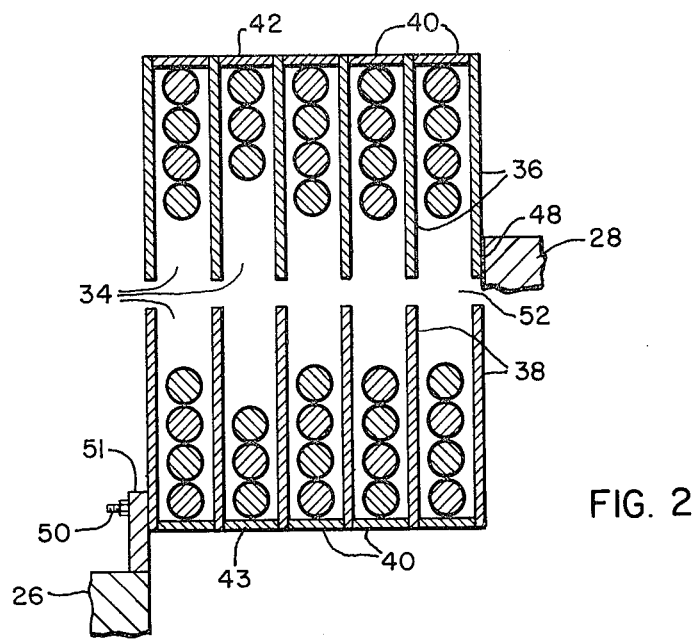
FIG. 2 is an elevation view, in section, of one embodiment of the invention disclosed herein.

In accordance with this invention the cables or hoses are supported within vertically oriented compartments 34, shown best in FIG. 2. It is to be understood that the following description of invention embodiments as applied to a nuclear reactor is merely exemplary, and that the invention can advantageously be used in many other applications involving limited reciprocating rotary or rectilinear motion among members. The figure shows one structural arrangement for the compartments 34, which includes a plurality of upper vertical plates or surfaces 36 and a plurality of second lower vertical surfaces 38. Substantially all of the surfaces 36, 38 include a laterally extending restraint 40, which can together form an integral upper plate 42 or lower plate 43, extending along the width of the plurality of surfaces 36, 38. The affixed set of lower surfaces 38 are affixed to one of the relatively movable members, such as the intermediate rotating plug 26, and the upper set of surfaces is affixed to the other member, such as the small rotating plug 28. Both the upper and lower surfaces are also provided with means for affixing the surfaces to their respective supporting members, such as welds 48 or bolts 50 or other fastening devices. The vertical surfaces 36, 38 need not be directly affixed to the relatively movable members, but can be affixed to extension components such as the riser plate 51. As the elevation of the relatively movable members such as the intermediate 26 and small 28 rotating plugs is typically fixed, each set of vertical surfaces is affixed to the respective member so as to laterally align the surfaces 36, 38. The surfaces are also affixed to the members with a preselected gap or space 52 between the laterally aligned surfaces. The gap 52 allows free relative motion, the upper surfaces 36 not contacting the lower surfaces 38.

Figure 3:
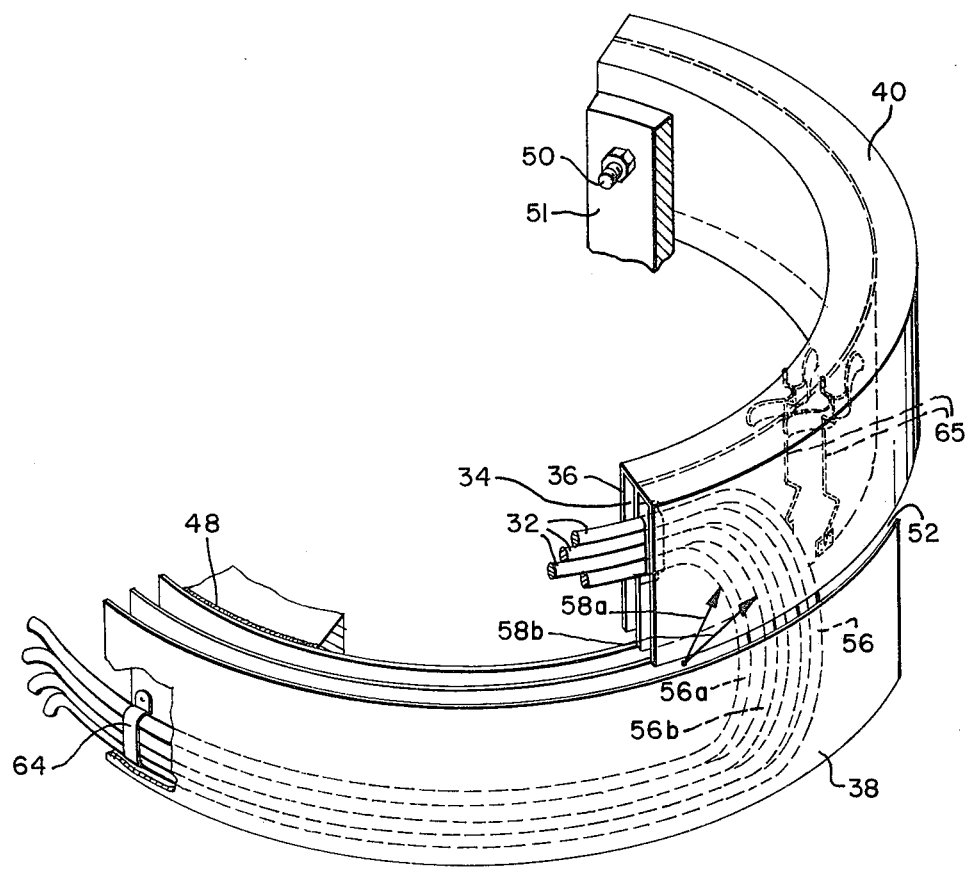
FIG. 3 is a perspective view of another embodiment of the invention.

The vertical surfaces 36, 38 can have various shapes, dependent on the type of motion of the two members. As shown in FIG. 3, where rotary motion is required, the surfaces are arcuate or circular, although they are preferably rectangular for relative rectilinear motion. The surfaces 36, 38 can be comprised of any structurally sound material, although they are preferably metallic and capable of providing electrical signal separation between laterally adjacent compartments 34.

The cables 32 are positioned between two consecutive aligned upper 36 and lower 38 surfaces, between their respective restraints 40, so that each cable forms a singular generally rotated-U-shaped or C-shaped loop 56 in a substantially vertical plane. A plurality of cables 32 can be positioned between one aligned pair of surfaces 36, 38. The cables are then positioned adjacent one another such that the loop 56 of one cable (56a) is contained within the horizontal area enclosed by the loop (56b) of its adjacent outermost cable. This necessarily requires that the bend radius 58a be smaller than the bend radius 58b. The term "radius" is here used to define the substantially circular shape each loop will take, although the loop will not be perfectly arcuate. The number of cables between any two sets of consecutive vertical surfaces is therefore determined by the minimum allowable cable bend radius and the height of the surfaces, 36, 38 between respective restraints 40. Although cables 32 of varying size and shape can be utilized, in the preferred nuclear reactor arrangement all of the cables are of circular cross section, with a substantially common outside diameter of 1 in. $\pm \frac{1}{8}$ in. The height of the gap 52 is preferably smaller than the cable diameter to alleviate any possible binding upon motion. Also, the lateral spacing between consecutive parallel vertical surfaces 36, 38 is less than two cable diameters to alleviate crossing of cables upon rotation or translation. A spacing providing approximately $1\frac{1}{2}$ times the cable diameter between consecutive surfaces is preferred.

Figure 6:
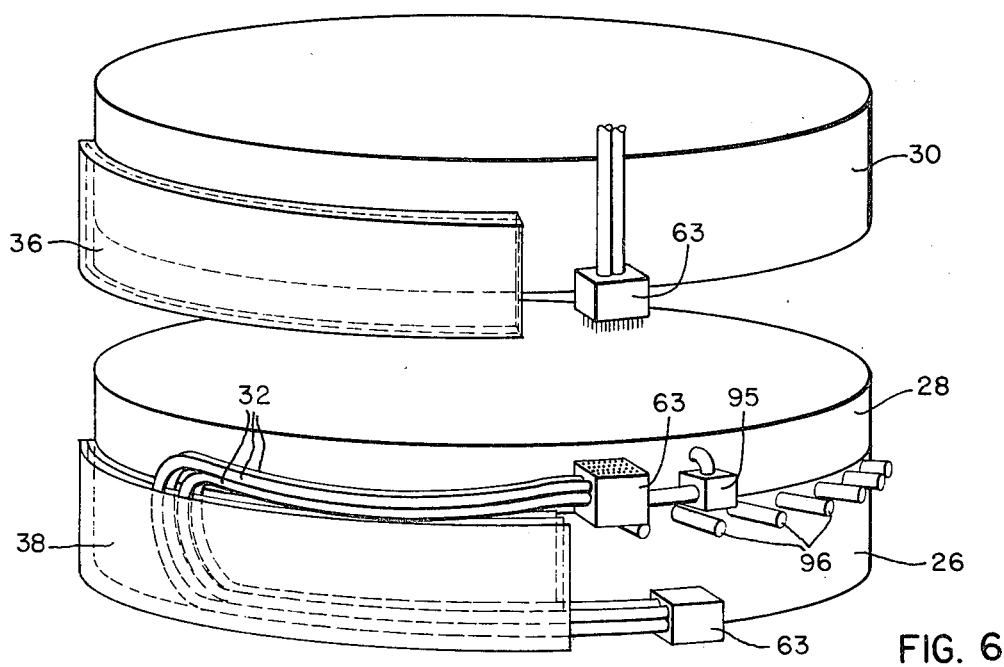
FIG. 6 is yet another perspective view of another embodiment of the invention.

The cables 32 can extend from one movable member to the other, or terminate in quick-disconnect electrical or fluid apparatus 63 such as that shown in FIG. 6. Portions of the cables, such as their end portions, are, however, substantially fixed or stationary relative to the respective movable members. These portions of the cables can also be held in place by means such as clips 64 shown in FIG. 3. The required length of the cables will, of course, be determined in accordance with the amount of rotary or rectilinear travel and the size of the relatively movable members.

Figure 4:
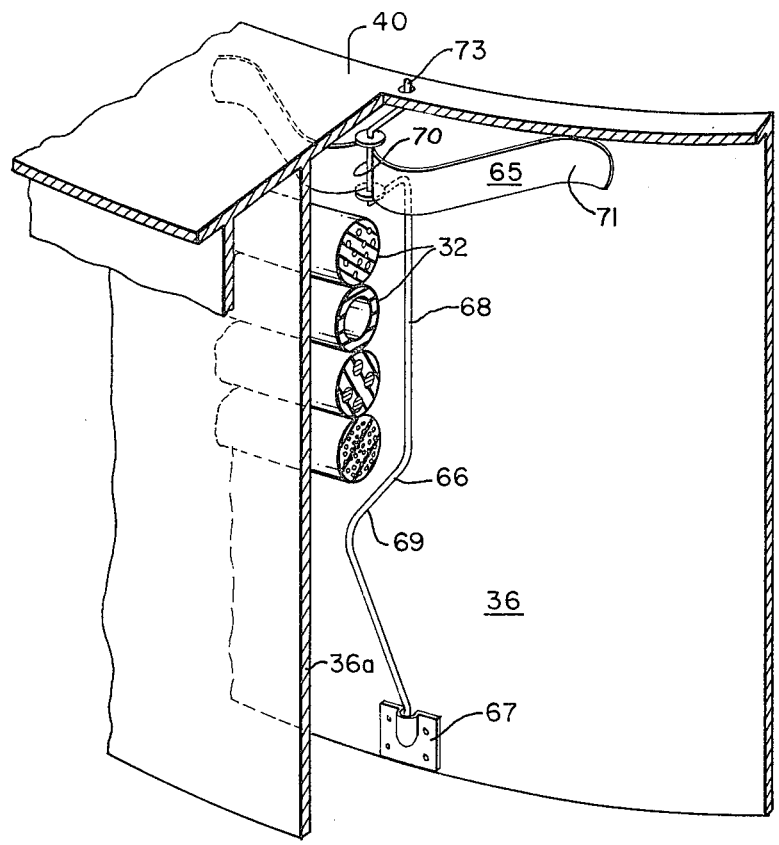
FIG. 4 is a perspective view of a spring device in accordance with this invention.

The upper surfaces 36 are also provided with a plurality of flexible devices 65 for supporting the upper portion of each looped cable. One embodiment of a device 65 is shown in additional detail in FIG. 4, and includes a body or wire 66 affixed by a bearing 67 to vertical surface 36 and to the horizontal surface 40 by a bearing 73. The wire is shaped to have a generally vertical upper section 68 and a generally crimped or triangular lower segment 69 positioned 90° from surface 36 by spring 71. The lower segment includes a portion spaced from vertical surface 36a a distance less than the diameter of the cables. The vertical section 68 is spaced from vertical surface 36a a distance greater than the cable diameter. A crimped rectangular segment 70 is positioned about the central portion of spring 71. Upon relative motion of the members in one direction, the loops of the cables contact the protruding triangular segment from below, rotate the segment laterally sliding and compressing spring 71, and pass above the segment, which rotates back to a position substantially perpendicular to surface 36, so as to then be supported atop the triangular segment. Upon relative motion in the opposite direction the loops cause the segment to rotate laterally and allow the cables to pass freely from the device 65. The device 65 can take many alternative configurations, including others which can be rotated, pushed aside or flexed by the passing cable loops to spring back into position to support the upper portion of the cables, or pushed aside as the cables return to the lower position.

Figure 5A:
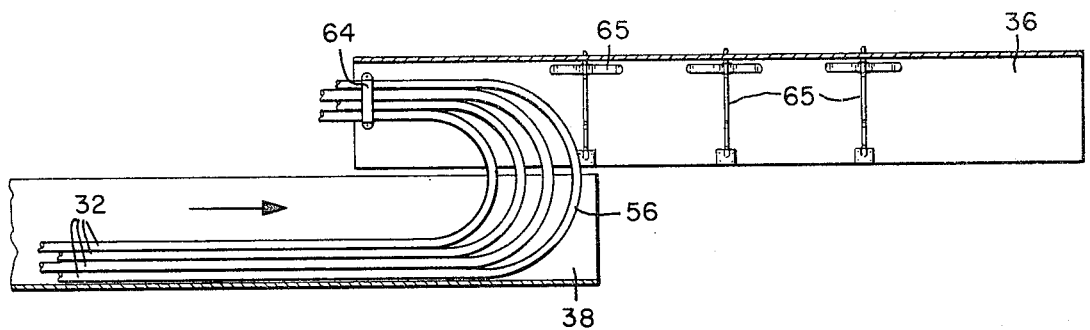
FIGS. 5A, 5B, and 5C are elevation views showing relative movement among components of this invention.
Figure 5B:
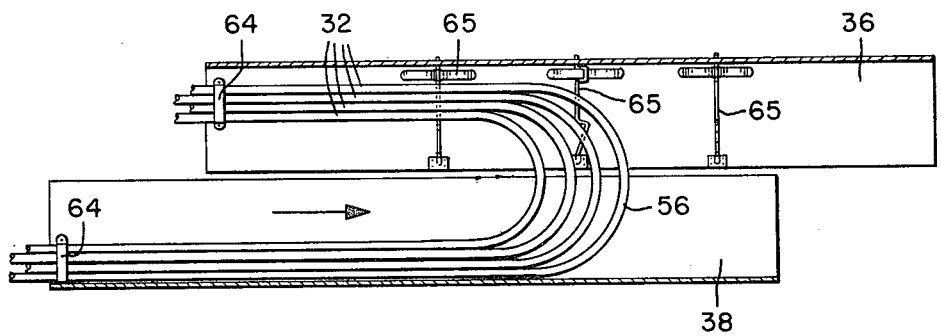
Figure 5C:
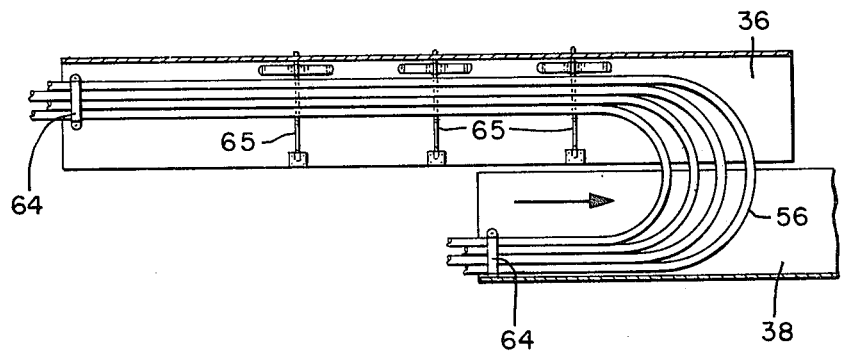

The operation of the connecting apparatus is simple, having a minimal number of moving components. In addition to the movable members, only the affixed vertical surfaces, the cables themselves, and the affected flexible devices 65 are in motion. Rectilinear movement is illustrated in FIGS. 5A, 5B, and 5C. These figures can also be viewed as illustrating relative rotary motion. The cables 32 and surfaces 36, 38 are initially positioned as shown in FIG. 5A. In this example, the upper surface 36 is fixed, while the surface 38 is moved from left to right, as shown by the arrow to, for example, the positions shown in FIGS. 5B and 5C. As shown, a portion of the cables is transferred from adjacent the lower surfaces 38 to adjacent the upper surfaces 36, as the loops 56 and cables slide. If the figures are viewed in reverse order, that is, from FIG. 5C toward FIG. 5A, it is seen that a portion of the cables shift from the upper surfaces to the lower surfaces. It is also seen that the cables will move into and out of the flexible devices 65 through the loops 56.

Figure 7A:
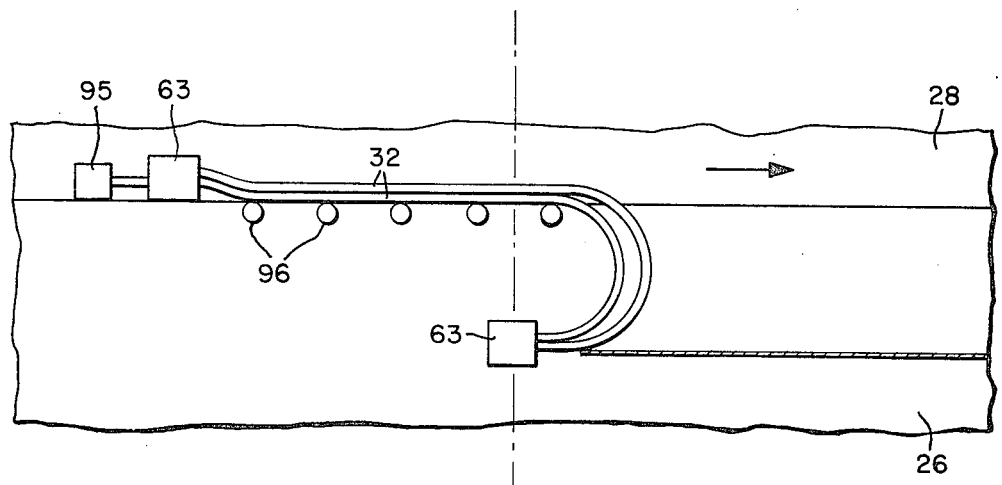
FIGS. 7A, 7B and 7C are elevation views showing relative movement of the embodiment of FIG. 6.
Figure 7B:
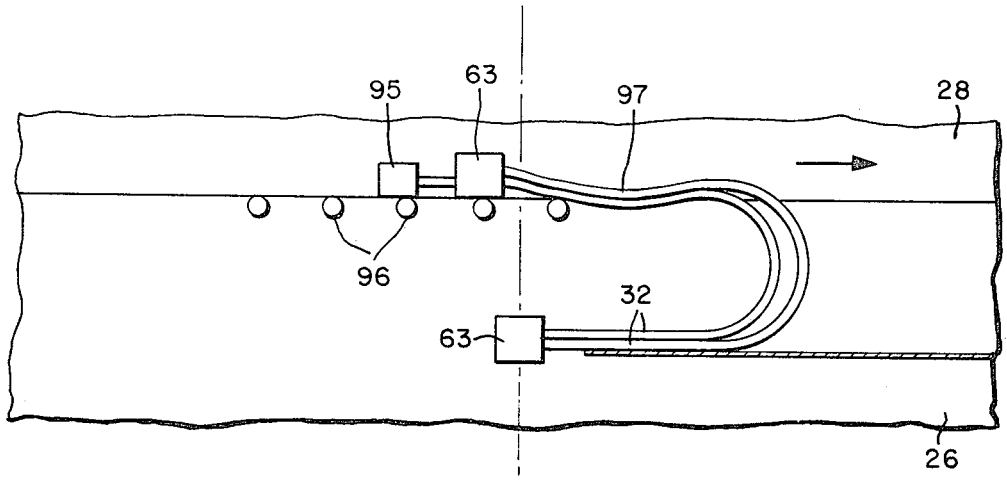
Figure 7C:
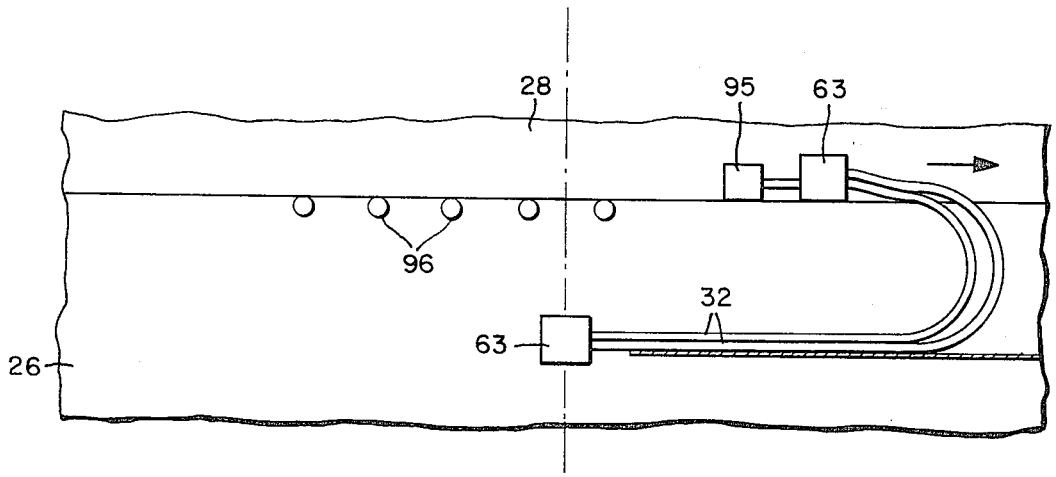

Another embodiment is shown in FIG. 6, the operation of which is illustrated in FIGS. 7A, 7B, and 7C. Here the cables 32 terminate in the quick-disconnect boxes 63. A lower box is affixed to an extension of the intermediate rotating plug 26, and an upper box is affixed to the small rotating plug 28. A third box is affixed to the in-vessel transfer mechanism 30, shown being lowered into position atop the small rotating plug. The lower vertical surfaces 38 are affixed to the intermediate plug extension, and the upper surfaces 36 are affixed to the transfer mechanism. The second disconnect box is affixed to support 95, so that the support 95 and the box are supported by and slide across a plurality of rollers 96 affixed to the intermediate plug extension. As the small rotating plug 28 and in-vessel transfer mechanism 30 are rotated, the cables 32 will slide onto, and from, the rollers 96. This is illustrated in FIGS. 7A, 7B, and 7C, exemplifying the situation where the rollers 96 and the lower box 63 are maintained stationary. Upon rotation of the upper box 63 from left to right, the cables are shown to slide off of the rollers. In the opposite direction, the cables conversely will slide onto the rollers. Although this embodiment eliminates the flexible devices 65, it requires the additional roller components 96. Further, the amount of rotation is limited relative to that attainable with the flexible devices 65. Further, it can be seen that a portion 97 of the cables will freely bend, significantly contributing to wear. The cables must be much stiffer for this embodiment in order to operate satisfactorily.

It will be apparent that many additional features can be incorporated in the connection apparatus, particularly for nuclear application. For example, a seal can be placed across the gap 52 of the outermost or innermost surfaces 36, 38 to insure that objects are not accidentally inserted through the gap. Also, for additional electrical separation or hazard protection, some compartments 34 can be left empty or filled with a suitable material. It will also be apparent that the connecting apparatus provides reliable operation and ease of maintenance or cable replacement. The cables can be replaced merely by disconnecting the extremities, removing the old cables from between surfaces 36, 38, and reinserting new cables in the looped configuration. Also, it will be noted that the described apparatus is particularly applicable where limited lateral space among components is available.

Many additional modifications are possible in view of the above teachings. It therefore is to be understood that within the scope of the appended claims, the invention may be practiced other than as specifically described.

We claim:

1. Apparatus for providing connection between a first member and a second member movable within a horizontal plane with respect to said first member, comprising:
   a. a first plurality of affixed vertical surfaces laterally spaced, each having a laterally extending upper restraint;
   b. a second plurality of affixed vertical surfaces laterally spaced, each having a laterally extending lower restraint;

c. structure for affixing said first surfaces to said first member and said second surfaces to said second member such that said first surfaces are laterally aligned with said second surfaces and are vertically spaced therefrom a preselected distance;

d. a plurality of flexible cables of substantially similar diameter, each said cable being stationary at one portion with respect to said first member and stationary at another portion with respect to said second member and positioned partially between two consecutive first surfaces and partially between two consecutive second surfaces and between their respective restraints so as to form a generally C-shaped loop in a substantially vertical orientation which slidingly moves with respect to said surfaces upon relative motion of said first and second members; and e. a plurality of flexible devices affixed to said first surfaces for supporting the upper portion of each said looped cable, said flexible device including a flexible body affixed to one of said first vertical surfaces having an upper section and a crimped lower segment, said lower segment spaced from one of said vertical surfaces a distance less than said diameter and said upper section spaced from said last-named surface a distance greater than said diameter, whereby upon relative motion of said members in one direction said loops of said cables contact said crimped segment from below, flex said segment laterally, and pass above said segment, and upon relative motion in the opposite direction said loops flex said segment laterally and pass free from said segment.

2. A nuclear reactor including substantially stationary members, a horizontally rotatable vessel head plug mounted above a nuclear core, and apparatus for providing connection between one of said members and said plug comprising:

a. a first plurality of affixed vertical surfaces laterally spaced, each having a laterally extending upper restraint;

b. a second plurality of affixed vertical surfaces laterally spaced, each having a laterally extending lower restraint;

c. structure for affixing said first surfaces to one of said plug and said one stationary member and said second surfaces to the other of said plug and said stationary member such that said first surfaces are laterally aligned with said second surfaces and are vertically spaced therefrom a preselected distance;

d. a plurality of flexible cables of substantially similar diameter, each said cable being stationary at one portion with respect to said first surfaces and stationary at another portion with respect to said second surfaces and positioned partially between two consecutive first surfaces and partially between two consecutive second surfaces and between their respective restraints so as to form a generally C-shaped loop in a substantially vertical orientation which slidingly moves with respect to said surfaces upon relative motion of said first and second members; and e. a plurality of flexible devices affixed to said first surfaces for supporting the upper portion of each said looped cable, said flexible device including a flexible body affixed to one of said first vertical surfaces having an upper section and a crimped lower segment, said lower segment spaced from one of said vertical surfaces a distance less than said diameter and said upper section spaced from said last-named surface a distance greater than said diameter, whereby upon relative motion of said members in one direction said loops of said cables contact said crimped segment from below, flex said segment laterally, and pass above said segment, and upon relative motion in the opposite direction said loops flex said segment laterally and pass free from said segment.

3. The apparatus of claim 2 wherein at least one of said cables is adjacent another one of said cables such that the loop of said one cable is of smaller radius than the loop of said adjacent cable and is contained within the substantially vertical area enclosed by the loop of said another cable.

4. The apparatus of claim 3 wherein all of said cables have a substantially similar outside diameter and wherein the lateral spacing between consecutive vertical surfaces is approximately 1½ said diameter.

5. The apparatus of claim 3 wherein all of said cables have a substantially similar outside diameter and said preselected distance is less than said diameter.

* * * * *